United States Patent
Thuillier et al.

(10) Patent No.: US 11,087,106 B2
(45) Date of Patent: Aug. 10, 2021

(54) METHOD OF EXTRACTING FEATURES FROM A FINGERPRINT REPRESENTED BY AN INPUT IMAGE

(71) Applicant: Idemia Identity & Security France, Courbevoie (FR)

(72) Inventors: Cédric Thuillier, Courbevoie (FR); Anthony Cazasnoves, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 47 days.

(21) Appl. No.: 16/562,614

(22) Filed: Sep. 6, 2019

(65) Prior Publication Data

US 2020/0082147 A1 Mar. 12, 2020

(30) Foreign Application Priority Data

Sep. 6, 2018 (FR) ...................................... 1858004

(51) Int. Cl.
*G06K 9/00* (2006.01)
*G06N 3/02* (2006.01)

(52) U.S. Cl.
CPC ......... *G06K 9/00013* (2013.01); *G06K 9/001* (2013.01); *G06K 9/00744* (2013.01); *G06N 3/02* (2013.01)

(58) Field of Classification Search
CPC ............... G06K 9/00013; G06K 9/001; G06K 9/00744; G06K 9/00067; G06N 3/02
See application file for complete search history.

(56) References Cited

U.S. PATENT DOCUMENTS

| 2005/0232472 | A1* | 10/2005 | Scholze | G06K 9/00067 382/124 |
| 2018/0137329 | A1* | 5/2018 | Kim | G06K 9/00114 |
| 2020/0193117 | A1* | 6/2020 | Raff | G06K 9/00067 |

OTHER PUBLICATIONS

Correspondence from the French National Institute of Industrial Property Office (INPI—Institute National De La Propriété Industrielle) for FR1858004 dated May 27, 2019; Preliminary Research Report of the French National Institute of Industrial Property Office for FR1858004 dated May 22, 2019; and Written Opinion on the Patentability of the Invention issued by the French National Institute of Industrial Property Office for FR1858004.
Li, J., Feng, J., Kuo, C.-C. J., 'Deep Convolutional neural network for latent fingerprint enhancement', Signal Processing: Image Communication, vol. 60, pp. 52-63, Feb. 1, 2018, doi: 10.1016/j.image.2017.08.010.

(Continued)

*Primary Examiner* — Abhishek Sarma
(74) *Attorney, Agent, or Firm* — Womble Bond Dickinson (US) LLP (57) ABSTRACT

The present invention relates to a method for extracting features of interest from a fingerprint represented by an input image, the method being characterized in that it comprises the implementation, by data processing means (21) of a client (2), of steps of:
(a) Binarization of said input image by means of a convolutional neural network, CNN, in such a way as to generate an image called binary;
(b) Processing said binary image so as to extract said features of interest from the fingerprint represented by said input image.

15 Claims, 6 Drawing Sheets

(56) References Cited

OTHER PUBLICATIONS

Chen, L.-C., Papandreou, G., Schroff, F., Adam, H., 'Rethinking Atrous Convolution for Semantic Image Segmentation', Google, Inc., Dec. 5, 2017, retrieved from https://arxiv.org/abs/1706.05587.
Szegedy, C., Liu, W., Jia, Y., Sermanet, P., Reed, S., Anguelov, D., Urhan, D., Vanhoucke, V., Rabinovich, A., 'Going deeper with convolutions', 2015 IEEE Conference on Computer Vision and Pattern Recognition (CVPR), pp. 1-9, Jun. 1, 2015, doi: 10.1109/cvpr.2015.7298594.
Tensmeyer, C., & Martinez, T., 'Document Image Binarization with Fully Convolutional Neural Networks', 2017 14th IAPR International Conference on Document Analysis and Recognition (ICDAR), pp. 99-104, Nov. 9, 2017, doi: 10.1109/icdar.2017.25.

* cited by examiner

METHOD OF EXTRACTING FEATURES FROM A FINGERPRINT REPRESENTED BY AN INPUT IMAGE

CROSS-REFERENCE TO RELATED APPLICATIONS

This application claims the benefit of French Patent Application No. 1858004 filed Sep. 6, 2018, the disclosure of which is herein incorporated by reference in its entirety.

GENERAL TECHNICAL FIELD

The present invention relates to the field of biometrics, and in particular proposes a method for extracting features of interest from a fingerprint represented by an input image, with a view to a biometric processing of the input image.

STATE OF THE ART

Biometric authentication/identification consists of recognizing an individual on the basis of biometric traits of that individual, such as fingerprints (digital recognition), the iris or the face (facial recognition).

Conventional biometric approaches use characteristic information of the biometric trait extracted from the acquired biometry, called features, and the training/classification is done on the basis of the comparison of these characteristics.

In particular, in the case of fingerprint recognition, fingertip images are processed so as to extract the features of a print that can be classified into three categories:
- Level 1 defines the general pattern of that print (one of four classes: right loop, left loop, arch and spiral), and the overall layout of the ridges (in particular, an orientation map called "Ridge Flow Matrix"—RFM map—is obtained, which represents the general direction of the ridge at each point of the print).
- Level 2 defines the particular points of the prints called minutia, which constitute "events" along the ridges (end of a ridge, bifurcation, etc.). The conventional recognition approaches essentially use these features.
- Level 3 defines more complex information such as the shape of the ridges, pores of the skin, scars, etc.

The method of extracting features from a print (in the form of feature maps) is called "encoding," which make it possible to compose a signature called "template" encoding the useful information in the final phase of classification. More specifically, classification will be done by comparing feature maps obtained with one or more reference feature maps associated with known individuals.

Today there are "encoders" that efficiently perform this operation of extracting features, i.e. algorithms carrying out a set of processes:
- Image improvement (contrast enhancement, noise reduction, etc.);
- Use of dedicated filters (Gabor of different resolutions, differentiators, etc.);
- Use of decision-making method (thresholding for binarization, extraction of points, etc.)

However, it is now desired to put such encoders on consumer equipment, such as smart phones, which are very restrictive in terms of performance, while the above-mentioned processing chain requires significant computing power and memory resources. Indeed, until now fingerprint recognition has been essentially carried out on fixed access terminals, having dedicated processing means.

One approach is to use neuron networks, which are already extensively used for data classification.

After an automatic training phase (generally supervised, meaning on an already classified reference database), a neural network "learns" and becomes capable on its own of applying the same classification to unknown data.

Convolutional neural networks (CNN) are a type of neural network in which the connection pattern between neurons is inspired by the visual cortex of animals. They are thus particularly suited to a specific type of classification, which is image analysis; indeed they allow efficient recognition of people or objects in images or videos, in particular in security applications (e.g. automatic surveillance, threat detection, etc.).

Also, in the field of biometric authentication/identification, a CNN can be trained to recognize an individual on the basis of biometric traits of that individual insofar as those data are handled in the form of images.

However, although such approaches have enabled major advances for example in facial recognition, their application to the recognition of fingerprints runs up against specifics inherent in fingerprints and until now the performance has not been persuasive. Moreover, the size of the neuron network must be limited in order to be able to meet the memory constraints of the aforementioned consumer equipment.

It would therefore be desirable to have a more lightweight solution for extracting features from a fingerprint, but which is however as effective as the existing solutions.

BRIEF DESCRIPTION OF THE INVENTION

According to a first aspect, the present invention relates to a method for extracting features of interest from a fingerprint represented by an input image, the method being characterized in that it comprises the implementation, by processing means of a client's data, of steps of:
(a) Binarization of said input image by means of a convolutional neural network, CNN, in such a way as to generate an image called binary;
(b) Processing said binary image so as to extract said features of interest from the fingerprint represented by said input image.

According to other advantageous and nonlimiting characteristics:
said CNN comprises a set of successive convolution layers having a decreasing filter size and a decreasing number of filters;
the last convolution layer of said set has a 1×1 filter size and generates said binary image at the output;
at least one other convolution layer of said set is of the dilated filter type, called Atrous, with a filter size between 3×3 and 7×7;
each other convolution layer of said set is of the dilated filter type, called Atrous, with a decreasing size of field of vision;
the last convolution layer of said set further generates a mask of confidence associated with said binary image;
said set of convolution layers comprises a block called of decompaction, wherein the number of filters decreases by a constant step from one convolution layer to the next;
said CNN comprises at least one block called Inception having a plurality of parallel branches with convolution layers having different sizes of field of vision;
at least one branch of the Inception block comprises a convolution layer having a filter size of 1×1, then a convolution layer of the dilated filter type called Atrous, with a filter size between 3×3 and 7×7;

one branch of the Inception block comprises a convolution layer having a 1×1 filter size, then a convolution layer with non-dilated 3×3 size filter; and/or one branch of the Inception block comprises a pooling layer, then a convolution layer having a 1×1 filter size;

the CNN successively comprises the Inception block(s) then the decompaction block;

the CNN comprises, in parallel with the decompaction block, a block called specialization generating at least one map of orientation of ridges of the fingerprint represented by said input image, called RFM map, said RFM map also being processed in step (b);

the method comprises a prior training step (a0), by data processing means of a server, from a database of fingerprint images already binarized, from parameters of said CNN;

said features of interest to be extracted from the fingerprint represented by said input image comprise the position and/or orientation of minutia;

said fingerprint represented by the input image is that of an individual, the method further comprising a step (c) of identifying or authenticating said individual by comparison of the features of interest extracted from the fingerprint represented by said input image, with the features from reference fingerprints.

According to a second and third aspect, the invention proposes a computer program product comprising code instructions for the execution of a method according to the first aspect of extraction of features of interest of a fingerprint represented by an input image; and a storage means readable by a computer equipment on which a computer program product comprises code instructions for executing a method according to the first aspect of extraction of features of interest from a fingerprint represented by an input image.

DESCRIPTION OF THE FIGURES

Other characteristics and advantages of the present invention will appear upon reading the following description of a preferred embodiment. This description will be given with reference to the attached drawings in which.

DETAILED DESCRIPTION

Principle and Architecture

The present method proposes a method for extracting features of interest from a fingerprint represented by an input image. This method consists typically of "encoding" the print, i.e. said features of interest to be extracted are typically "biometric" features, namely "final" features making it possible to compose a template of the fingerprint for purpose of classification (identification/authentication of individual, see below). In this respect, said desired characteristics typically describe minutia, i.e. they comprise the position and/or orientation of the minutia. However, it will be understood that the present method is not limited to this embodiment, and all the features possibly of interest in biometrics can be extracted at the end of this method.

The present method stands out in that it offers a step (a) of binarization of said input image by means of a convolutional neural network, CNN, in such a way as to generate an image called binary. Indeed, while the input image is in color or typically grayscale, the binary image is only composed of white or black zones, the white zones representing the ridges and the white zones the valleys between the ridges, and it is therefore particularly clear and readable.

The binary image can be viewed as a map of "intermediate" features of the input fingerprint (features map) It should be noted that it is known to binarize a fingerprint image as "pre-processing" by image processing algorithms, but it has been discovered that it was possible to perform this binarization very effectively with neuron networks of limited size meeting the constraints of being embedded in a consumer type equipment such as a smart phone.

More specifically, binarizing the image considerably facilitates subsequent processing for extracting the features of interest from the print (thus limiting the resources required), while being easily embedded as will be shown. Thus, a complete embedded encoder having the same performance as known encoders can be embedded.

Figure 1:
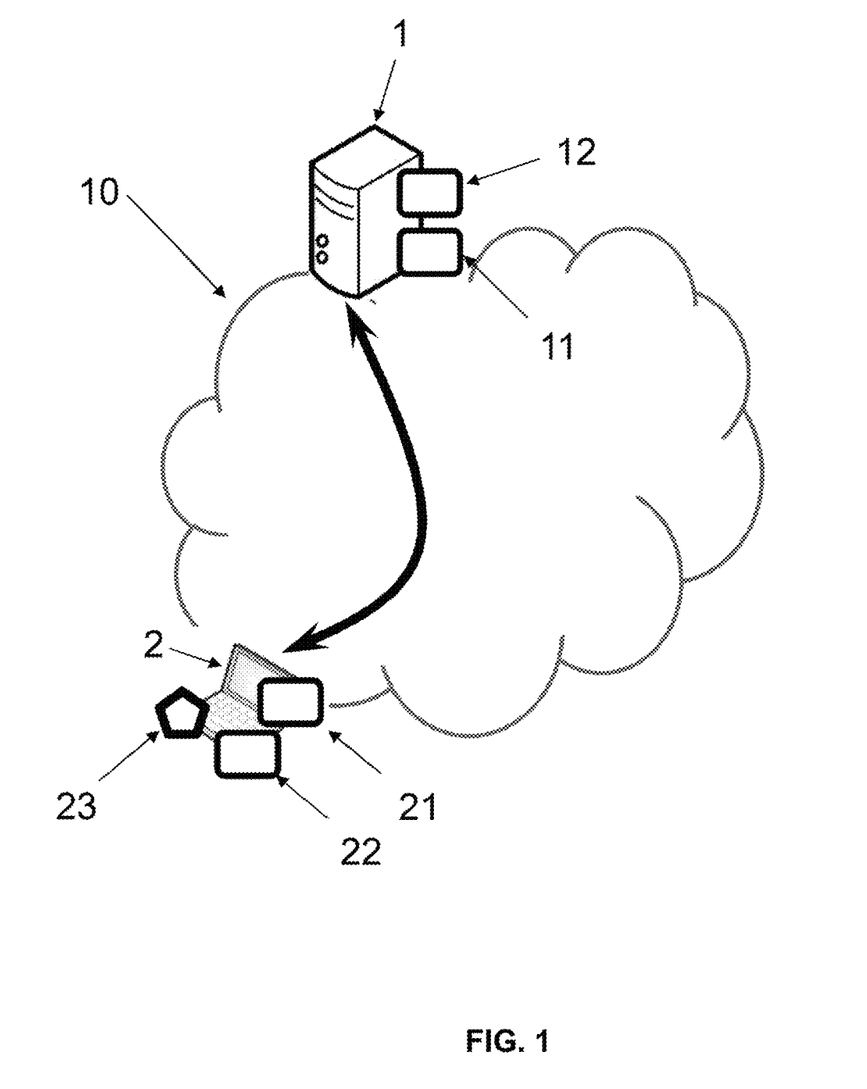
FIG. 1 is a diagram of an architecture for implementation of the methods according to the invention.

The present method is implemented within an architecture such as shown by FIG. 1, with a server 1 and a client 2. The server 1 is the training device (implementing the training of the CNN) and the client 2 is a classification device (implementing the present method of extracting features of interest from a fingerprint), for example a user terminal.

It is quite possible for both devices 1, 2 to be combined, but preferably server 1 is that of a security service provider, and client 2 a personal consumer device, particularly a smart phone, a personal computer, a tablet, a safe, etc.

In any case, each device 1, 2 is typically remote computer equipment connected to an extended network 10 such as the Internet for the exchange of data. Each comprises data processing means 11, 21 of processor type, and data storage means 12, 22 such as computer memory, for example a flash memory or a hard disc.

The server 1 stores a training database, i.e. a set of fingerprint images for which a binarized image is already available (and optionally other information such as RFM maps—see below) in contrast with the so-called input images that are to be processed.

The client device 2 advantageously comprises a fingerprint scanner 23, so as to be able to directly acquire said input image, typically so that a user can be authenticated.

CNN

A CNN generally comprises four types of layers successively processing information:

the convolution layer which processes blocks from the input one after the other;

the nonlinear layer with which to add nonlinearity to the network and therefore to have much more complex decision functions;

the pooling layer with which to combine several neurons into a single neuron;

the fully connected layer which connects all the neurons from one layer to all the neurons of the preceding layer (for classification).

The non-linear layers are often preceded by a batch normalization layer ("BN layer") before each nonlinear layer NL, so as to accelerate the training.

The non-linear layer NL activation function is typically the ReLU function (rectified linear unit) which is equal to f(x)=max(0, x) and the most used pooling layer (labeled POOL) is the function AvgPool which corresponds to an average among the values of a square (several values are pooled into only one).

The convolution layer, labeled CONV, and the fully connected layer, labeled FC, generally correspond to a scalar product between the neurons of the preceding layer and the weight from the CNN.

Typical CNN architectures stack several pairs of CONV→NL layers and then add a POOL layer and repeat this plan [(CONV→NL)$^p$→POOL] until getting a sufficiently small size output factor, and then ending by two fully connected FC layers.

This is a typical CNN architecture:

INPUT→[[CONV→NL]$^p$→POOL]$^n$→F→FC

In the present CNN, it is understood that no FC layer is necessary insofar as the expected result is not a class but the binary image, which is a map of features.

In general, said CNN comprises a set of successive convolution layers. In a known way and as explained above, each of said convolution layers can be followed by a batch normalization layer BN and/or a non-linear layer, in particular ReLU, preferably both in that order.

In order to produce the binarization, said set of successive convolution layers advantageously has a decreasing filter size and a decreasing number of filters. The decrease of the filter size thus enables a fusion of the image by iterative reduction. As will be seen, said set is arranged at the "end" of the CNN, i.e. at the output thereof: the last convolution layer of said set advantageously has a 1×1 filter size and generates said binary image at the output.

Indeed, it will be remembered that a convolution layer is defined by a set of filters (or "kernels") implemented on a block of the input, i.e. a sub-surface. The number of filters used defines the size of the output vector, and the size of these filters defines the extent of the surface considered. The use of large-size filters makes it possible to consider a rather large area but exponentially increases the memory footprint, this is why it is necessary to preserve a balance.

Thus, the final convolution of 1×1 filter size makes it possible to merge the multidimensional information from the preceding layers into a features map 1 which constitutes the binary image.

It should be noted that this last convolution layer can have a single filter, i.e. generate only the binary image, or it can have a second filter so as to further generate a mask of confidence associated with said binary image.

Figure 2:
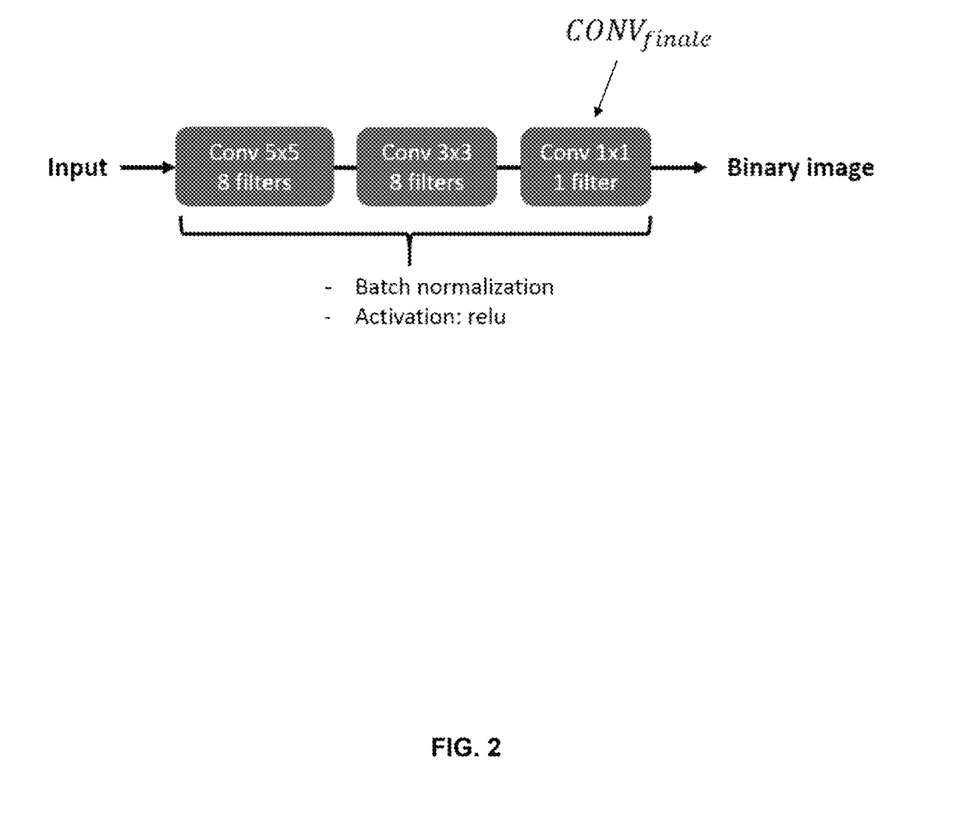
FIG. 2 depicts a first possibility of convolutional neural network.

FIG. 2 represents a first possibility of binarization CNN having a minimal size and memory footprint.

Said CNN is in fact reduced to said set of successive convolution layers, and comprises two "head" convolution layers creating depth.

The first convolution layer has eight 5×5 size filters, the second convolution layer has eight 3×3 size filters, and the last convolution layer labeled CONV$_{finale}$ (the third) has one 1×1 size filter.

Thus, it can be seen that there is a constant number of eight filters before dropping to one, i.e. in practice it is only the last layer CONV$_{finale}$ that allows the binarization (and does not have other outputs).

This CNN is very interesting in view of its particularly small size, but if it is desired to improve the quality, it is preferable to have a strictly decreasing number of filters on the set, i.e. a progressive decrease in the number of filters.

Decompaction

Figure 3:
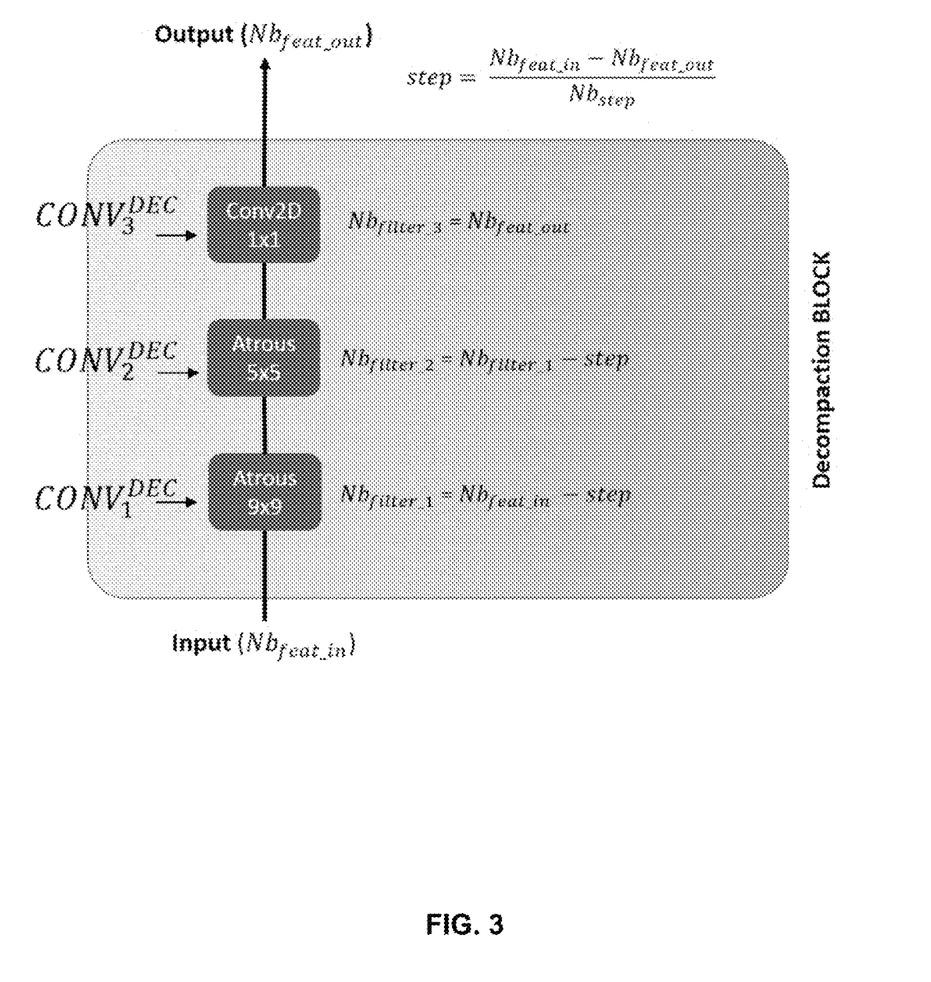
FIG. 3 depicts an example of a decompaction block used in embodiments of the method according to the invention.

Thus, with reference to FIG. 3, instead of the last convolution layer CONV$_{finale}$ alone providing the binarization, a block called of "decompaction" is provided that contains a plurality therefrom (labeled CONV$_i^{DEc}$, i∈⟦1;n⟧, n≥2, i.e. at least two successive convolution layers, advantageously three, DEC meaning "decompaction").

The number of filters decreases at a constant step of one convolution layer CONV$_i^{DEC}$ from the decompaction block to the next CONV$_{i+1}^{DEC}$. The last layer CONV$_n^{DEC}$ of the decompaction block preferably has a 1×1 filter size like the final convolution layer CONV$_{finale}$ presented above, but the progressive reduction of the filter size makes it possible to avoid the loss of information and therefore to reduce the noise. The quality of the binarization is thus substantially improved.

In the decompaction block, the number of feature maps at the input of the block is defined NB$_{feat\_in}$, the number of feature maps at the output of the block NB$_{feat\_out}$, and the number of convolution layers in the block NB$_{step}$ (which corresponds to n as previously defined). Said constant step step is then defined by the formula $$\text{step} = \frac{NB_{feat\_in} - NB_{feat\_out}}{NB_{step}}.$$

For example, by defining that there are three layers in the block as in the example of FIG. 3, that the number of feature maps at the output is two (as explained, binary image and mask of confidence), and that the number of feature maps at the input is eight (as at the output of the second convolution layer of the CNN of FIG. 2), then step=2 is obtained, i.e. the first convolution layer CONV$_1^{DEC}$ of the CNN of FIG. 3 has six filters, the second convolution layer CONV$_2^{DEc}$ of the CNN of FIG. 3 has four filters, and as expected the third convolution layer (final) CONV$_3^{DEC}$ of the CNN of FIG. 3 has two filters.

In the lower quality zones of the input image, it is noted that the decompaction block enables more extensive spatial information to be taken into account and thus to propose a continuous segmentation. For the same reason, when there is an occlusion zone in the image, the decompaction makes it possible to find a connectivity between the ridges and valleys at the edges of that region without information.

It will be noted that it is quite possible that there are other convolution layers in the CNN, particularly upstream of and/or in parallel with the decompaction block.

Atrous Convolutions

Advantageously, as can be seen in FIG. 3, at least one convolution layer of the decompaction block other than the last one, i.e. CONV$_i^{DEc}$, i∈⟦1;n−1⟧, is of the dilated filter type, called Atrous.

Indeed, in order to propose a quality binarization of a fingerprint, it is necessary to be able to discern the differences between a valley and a fold of skin or a scar present on the user's finger.

This decision-making necessarily involves the use of consolidated information over a rather large area, and it comes down to the benefit of large size filters, which unfortunately have a large memory footprint.

Figure 4:
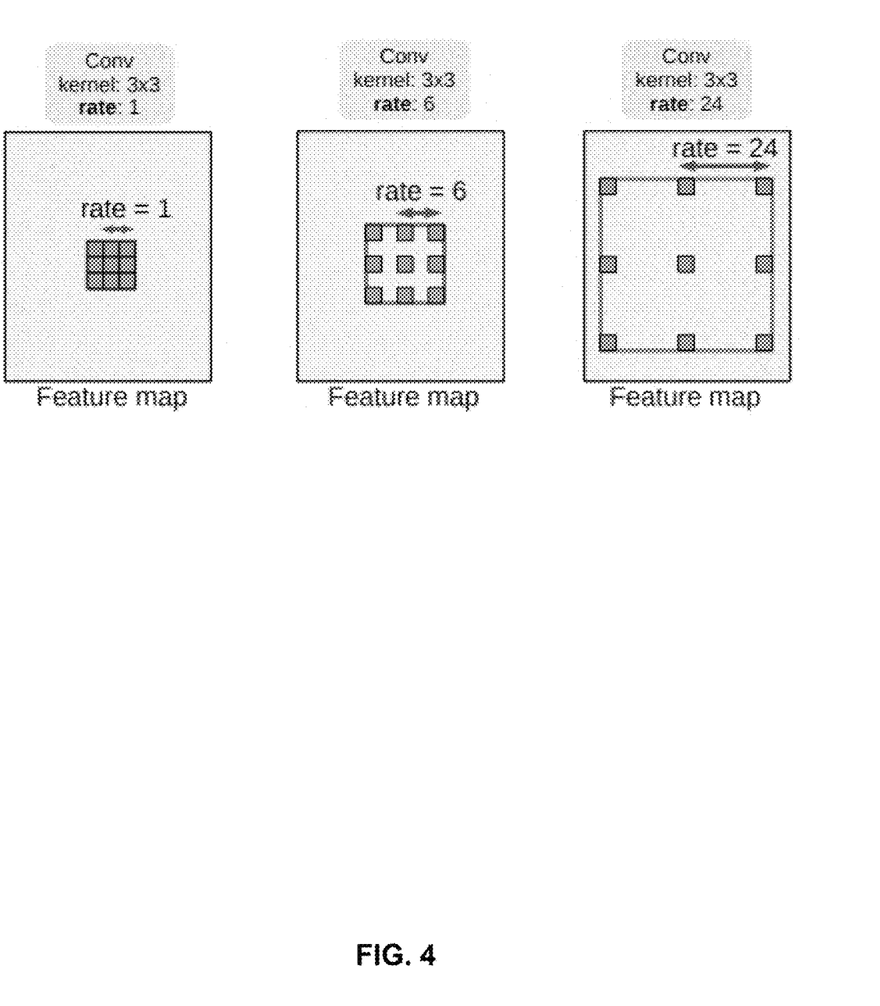
FIG. 4 illustrates examples of Atrous type convolutions.

The use of Atrous convolution layers (see for example the document Chen, L. C., Papandreou, G., Schroff, F, & Adam, H. (2017). *Rethinking atrous convolution for semantic image segmentation. arXiv preprint arXiv:*1706.05587, from which FIG. 4 is taken) allows this limitation to be eliminated. By starting from a small size filter—for example 3×3—it is possible to extend the field of vision thereof by distributing the coefficients used according to a selected spacing, see FIG. 4. This can also be seen as the use of a sparsity-based filter of the final dimension.

To restate, while in a "normal" convolution, i.e. with a non-dilated filter, the size of the field of vision and the size of the filter match, while in an Atrous convolution, i.e. with a dilated filter, the size of the field of vision is greater than the size of the filter due to the spacing between the pixels considered.

In particular, irrespective of the size of the field of vision a reasonable filter size can be kept between 3×3 and 7×7 compatible with the embedding on consumer equipment.

And preferably, every other convolution layer $CONV_i^{DEc}$, $\forall i \in [\![1;n-1]\!]$ of said decompaction block is of the dilated filter type, called Atrous (i.e. only the last one is a "normal" convolution, it should be noted that a convolution layer with 1×1 size filter cannot be Atrous, the size of the field of vision necessarily being also 1×1), with a decreasing size of field of vision.

In the example of FIG. 3, the first and second convolution layer, thus of Atrous type, each have a 3×3 filter size, but their field of vision size is respectively 9×9 and 5×5.

Inception

One problem encountered in extracting fingerprint features is the deformation of the fingers. In order for the CNN to cope with this deformation, it is desirable that it be able to manage different resolutions corresponding to different zoom levels.

The introduction of such a "multi-resolution" component is a possibility offered by so-called Inception blocks that constitute the network of the same name described for example in the document Szegedy, C., Liu, W, Jia, Y, Sermanet, P, Reed, S., Anguelov, D., . . . & Rabinovich, A. (2015, June). Going deeper with convolutions. Cvpr., to which the person skilled in the art will be able to refer.

Figure 5:
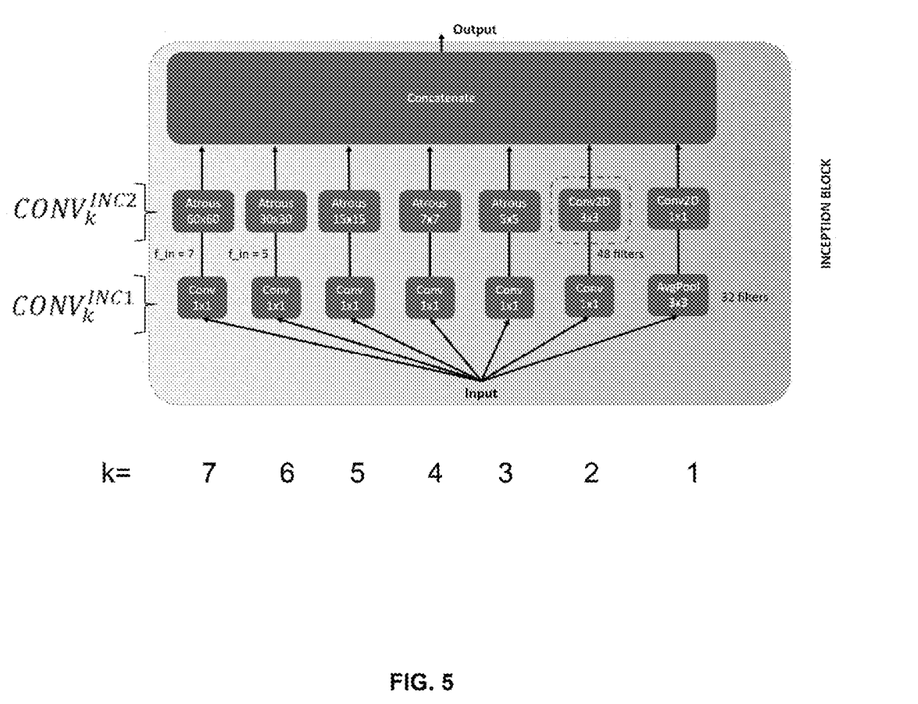
FIG. 5 depicts an example of an Inception block used in the embodiments of the method according to the invention.

Thus, the present CNN advantageously comprises such an Inception block, one advantageous embodiment of which is represented by FIG. 5.

A so-called Inception block has a plurality of parallel branches with convolution layers $CONV_k^{INC2}$, $k \in [\![1;1]\!]$, $l \geq 2$ having different sizes of field of vision, the different branches providing information at each of the scales. In the example of FIG. 4, l=7, and the subsequent field of vision sizes (in the order of the branches): 1×1, 3×3, 5×5, 7×7, 15×15, 30×30, 60×60.

At the end of the Inception block, a concatenation module accumulates the feature maps of the different branches.

Preferably each branch has two layers, one of which is a 1×1 convolution layer (normally at input; the particular case of the first branch will be seen further on, i.e. k=1).

Thus, at least one branch of the Inception block (preferably all except one or two, currently all of the branches $k \in [\![3;1]\!]$ comprises a convolution layer $CONV_k^{INC1}$ having a 1×1 filter size, then a convolution layer $CONV_k^{INC2}$ of the dilated filter type, called Atrous, again with a filter size between 3×3 and 7×7. More specifically, all the Atrous convolution layers with a field size up to 15×15 (those of the 3rd, 4th and 5th branches) can have a filter size of 3×3, but beyond that (case of the 6th branch where the convolution layer $CONV_6^{INC2}$ has a 30×30 field of vision size and of the 7th branch where the convolution layer $CONV_7^{INC2}$ has a 60×60 field of vision size), preferably 5×5 and 7×7 filter sizes are used respectively to preserve a reasonable spacing between two coefficients of the filter, ensuring a real use of the information included in the extended field of vision, while preserving a limited memory footprint compatible with the embedding on consumer devices.

Furthermore, one branch of the Inception block can comprise a convolution layer $CONV_2^{INC1}$ having a 1×1 filter size, then a convolution layer ($CONV_2^{INC2}$) with 3×3 size non-dilated filter; and/or one branch of the Inception block comprises a pooling layer $POOL_1^{INC1}$, then a convolution layer $CONV_1^{INC2}$ having a 1×1 filter size. In the example of FIG. 5, there are both of them.

The 2nd branch corresponds to a 3×3 field of vision size, i.e. the filter size is required to match the field of vision size, with the result that the convolution is normal and not Atrous.

The first branch corresponds to a 1×1 field of vision size, i.e. a 1×1 filter size. This branch could only comprise the 1×1 convolution layer, but preferably it is placed in 2nd position and preceded by a pooling layer (typically 3×3 AveragePooling, i.e. an average on a 3×3 size square) so as to increase the information of this branch.

Each convolution layer $CONV_k^{INC1,2}$ can have a relatively high filter number, for example 32, in order to create depth. In the example of FIG. 5, the convolution layer ($CONV_2^{INC2}$) with 3×3 size non-dilated filter has 48 filters by way of exception, because of the benefit of the information it encodes (it is the last "non-Atrous" convolution, i.e. which has access to all the information in a non-fragmented way. The person skilled in the art will know how to adapt the number of filters based on the constraints, particularly the memory footprint to be respected.

Example of CNN

Preferably, the CNN successively comprises the Inception block(s) (preferably two) then the decompaction block.

Figure 6:
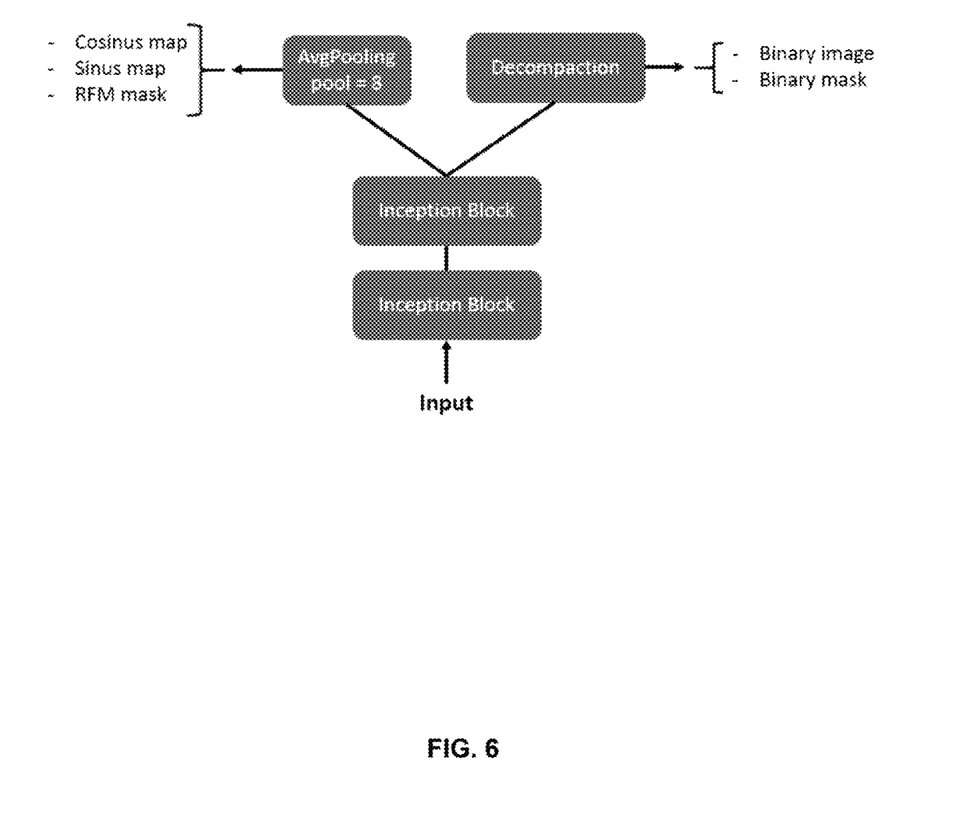
FIG. 6 depicts an example of convolutional neural network for the implementation of the method according to the invention.

In a particularly preferred embodiment, illustrated by FIG. 6, the CNN comprises in parallel with the decompaction block a so-called specialization block generating other useful maps, and in particular at least one ridge orientation map of the fingerprint represented by said input image, called RFM map, and where appropriate the associated mask of confidence. More specifically, the branch produces a sinus map and a cosinus map, encoding both of them the RFM.

Indeed, the RFM maps generally have a resolution lower than the input image or the binary image (e.g. one eighth), and the separation into two branches makes it possible to incorporate this difference in resolution and to allow a specification of the training for the different maps considered.

There is therefore a "common core" composed of the Inception blocks, then two branches, the specialization branch (i.e. the specialization block) and the binarization branch (i.e. the decompaction block).

In the example of FIG. 6, the decompaction block is composed of a pooling layer (e.g. AveragePooling 8×8 so as to divide the resolution by eight).

Such a network proves to be particularly interesting due to its ability to produce at the same time the binary image and the RFM map, for a reasonable size.

Training and Classification

Advantageously, the method begins by a training step (a0), by the data processing means 11 of the server 1, from a database of fingerprint images already binarized, from parameters of said CNN.

This training can be achieved conventionally, for example by using the Keras framework. The training cost function can be composed of an attachment to the conventional data—average quadratic error—and a total variation regularization.

It should be noted that said database of already binarized fingerprint images can be constructed using a known binarization algorithm (for example contrast enhancement), and similarly for the mask of confidence. Moreover, conventionally, augmentation algorithms can be used so as to demultiply the size of the training base, in order to ensure the robustness of the CNN to usual acquisition defects.

In a case where the CNN has a specialization branch, the latter can be trained if the corresponding orientation map is also available for each print from said database (again by using a known algorithm, if appropriate).

The trained CNN can be stored as necessary on data storage means 22 of the client 2 for use in binarization. It should be noted that the same CNN can be embedded on numerous clients 2, only one training is necessary.

In a main step (a), said input image is binarized by the data processing means 21 of the client 2 by means of the embedded CNN, so as to generate the binary image.

Next, in a step (b), said binary image can be processed so as to extract said features of interest from the fingerprint represented by said input image, which notably can comprise the position and/or orientation of minutia.

Preferably the method further comprises a step (c) of identifying or authenticating said individual by comparing the features of interest extracted from the fingerprint represented by said input image, with the fingerprint features of reference, which can be implemented in any known way by the person skilled in the art.

For example, the client 2 can store the features of the prints of one or more authorized users as reference prints, so as to manage the unlocking of the client equipment 2 (particularly in the case of an input image acquired directly by an integrated scanner 23); if the extracted features correspond to those expected from an authorized user, the data processing means 21 consider that the individual attempting to be authenticated is authorized, and they proceed with the unlocking.

Alternatively, the client 2 can send the extracted features to a remote database of said reference fingerprint features, for identification of the individual.

Different tests of the present method have been carried out. A database of images of prints acquired at a resolution of 500 dpi was established. 90% of the images are dedicated to the training, 10% to evaluation. The input image of the network is a patch selected in a random zone of the full resolution image.

A first test compares, for examples of input images, the predetermined corresponding binary images and the binary images obtained by the implementation of the minimal CNN of FIG. 2.

The obtained results are of good quality, the ridge/valley demarcation obtained is clear and the TV normalization enables good homogeneity to be ensured for each of these categories. However, a slight imbalance of distribution between valleys and ridges is noted. Moreover, it appears that the minimal CNN sometimes erroneously connects ridges (most of the time scars/skin folds can be considered as ridges).

In a second test this time using the preferred CNN of FIG. 6, on the one hand the corresponding predetermined binary images and the obtained binary images, and on the other hand the predetermined corresponding masks of confidence and the masks of confidence obtained are compared for the input image examples.

The multi-resolution approach combined with the use of filters of larger sizes makes it possible to ensure good continuity of the segmentation at the skinfold, and a balanced distribution is noted between valleys and ridges, as well as a robustness to the scars.

Other tests have shown that in the zones of lower quality, the decompaction block enables more extensive spatial information to be taken into account and thus to propose a continuous segmentation. For the same reason, when there is an occlusion zone in the image, the decompaction makes it possible to efficiently find a connectivity between the ridges and valleys at the edges of that region without information.

Furthermore, the suitability observed for the binarization branch is confirmed on the specialization branch (dedicated to the orientation maps such as the RFM).

Computer Program Product

According to a second and third aspect, the invention relates to a computer program product comprising code instructions for execution (in particular on data processing means 11, 21 of the server 1 and/or of the client 2) of a method of extracting features of interest from a fingerprint represented by an input image, as well as storage means readable by a computer equipment (a memory 12, 22 of the server 1 and/or of the client 2) on which said computer program product is located.

The invention claimed is:

1. A method for extracting features of interest from a fingerprint represented by an input image, the method being characterized in that it comprises the implementation, by data processing means (21) of a client (2), of steps of:
   (a) Binarization of said input image by means of a convolutional neural network, CNN, so as to generate an image called binary, said CNN comprising a block, called of decompaction, of successive convolution layers having a decreasing filter size and a decreasing number of filters, such that the number of filters decreases by a constant step from one convolution layer of the decompaction block to the next;
   (b) Processing said binary image so as to extract said features of interest from the fingerprint represented by said input image.

2. The method according to claim 1, wherein the last convolution layer of said decompaction block has a 1×1 filter size and generates in output said binary image.

3. The method according to claim 2, wherein at least one other convolution layer of said decompaction block is of dilated filter type, called Atrous, with a filter size between 3×3 and 7×7.

4. The method according to claim 3, wherein each other convolution layer of said decompaction block is of dilated filter type, called Atrous, with a decreasing size of field of vision.

5. The method according to claim 2, wherein the last convolution layer of said decompaction block further generates a mask of confidence associated with said binary image.

6. The method according to claim 1, wherein said CNN comprises at least one block called Inception having a plurality of parallel branches with convolution layers having different sizes of field of vision.

7. The method according to claim 6, wherein at least one branch of the Inception block comprises a convolution layer having a 1×1 filter size, then a convolution layer of dilated filter type, called Atrous, with a filter size between 3×3 and 7×7.

8. The method according to claim 6, wherein one branch of the Inception block comprises a convolution layer having a 1×1 filter size, then a convolution layer with 3×3 size non-dilated filter; and/or a branch of the Inception block comprises a pooling layer, then a convolution layer having a 1×1 filter size.

9. The method according to claim 6, wherein the CNN successively comprises the Inception block(s) then the decompaction block.

10. The method according to claim 9, wherein the CNN comprises, in parallel with the decompaction block, a block called of specialization generating at least one map of orientation of ridges of the fingerprint represented by the input image, called RFM map, said RFM map also being processed in step (b).

11. The method according to claim 1, comprising a prior training step (a0), by data processing means (11) of a server (1), from a database of fingerprint images already binarized, from parameters of said CNN.

12. The method according to claim 1, wherein said features of interest to be extracted from the fingerprint represented by said input image comprise the position and/or orientation of minutia.

13. The method according to claim 1, wherein said fingerprint represented by the input image is that of an individual, the method further comprising a step (c) of identifying or authenticating said individual by comparison of features of interest extracted from the fingerprint represented by said input image, with the features of reference fingerprints.

14. A non-transitory computer program product comprising code instructions for the execution of a method according to claim 1 of extraction of features of interest from a fingerprint represented by an input image, when said program is executed on a computer.

15. A storage means readable by a computer equipment on which a computer program product comprises code instructions for the execution of a method according to claim 1 of extraction of features of interest from a fingerprint represented by an input image.

* * * * *